United States Patent
Lin et al.

(10) Patent No.: US 7,321,765 B2
(45) Date of Patent: Jan. 22, 2008

(54) TIMING METHOD FOR MOBILE STATION IN WIRELESS COMMUNICATION SYSTEM AND RELATED DEVICES

(75) Inventors: Chun-Hsiung Lin, Taipei (TW); Sung-Yao Lin, Taipei (TW)

(73) Assignee: MediaTek Incorporation, Hsin-Chu Hsien (TW)

( * ) Notice: Subject to any disclaimer, the term of this patent is extended or adjusted under 35 U.S.C. 154(b) by 0 days.

(21) Appl. No.: 10/904,747

(22) Filed: Nov. 25, 2004

(65) Prior Publication Data

US 2005/0124336 A1    Jun. 9, 2005

(30) Foreign Application Priority Data

Dec. 5, 2003   (TW) .................... 92134473 A
Aug. 3, 2004   (TW) .................... 93123269 A

(51) Int. Cl.
*H04Q 7/20*    (2006.01)

(52) U.S. Cl. ............... 455/423; 455/445; 455/436; 455/425

(58) Field of Classification Search ............. 455/436, 455/445

See application file for complete search history.

(56) References Cited

U.S. PATENT DOCUMENTS

| 6,055,429 | A | * | 4/2000 | Lynch | 455/445 |
| 6,101,383 | A | * | 8/2000 | Poon | 455/425 |
| 6,845,238 | B1 | * | 1/2005 | Muller | 455/436 |
| 2002/0006805 | A1 | * | 1/2002 | New et al. | 455/525 |

* cited by examiner

*Primary Examiner*—Lester G. Kincaid
*Assistant Examiner*—Charles Shedrick
(74) *Attorney, Agent, or Firm*—Winston Hsu

(57) ABSTRACT

A timing method used by a mobile station in a wireless communication system. The timing method contains generating at least a buffering area in the mobile station; receiving a first action executed by a lower layer of the mobile station; after the mobile station receives the first action, updating a value stored in the buffering area; and if the value stored in the buffering area reaches a predetermined value, the mobile station performs a second action.

23 Claims, 6 Drawing Sheets

TIMING METHOD FOR MOBILE STATION IN WIRELESS COMMUNICATION SYSTEM AND RELATED DEVICES

BACKGROUND

The present invention relates to wireless communication, and more particularly, to a timing method for a mobile station in a wireless communication system and related devices.

As wireless communication system technology progresses, wireless communication and personal mobile communication have become an essential portion of daily life for a great number of persons. Among various kinds of wireless communication specifications, the third generation wireless communication specification has become popular because of integrating various functionalities such as voice communication, message service, and even audio/video and text data transmission.

Please refer to FIG. 1 illustrating a diagram of a wireless communication system 10. The wireless communication system 10 includes a plurality of cells (not shown in FIG. 1) provided with communication service by a plurality of base stations. Because the plurality of cells are usually adjacent to one another, this kind of wireless communication system is usually referred to as a cellular wireless communication system. For simplicity, only a single cell 12 is illustrated as an example in FIG. 1, wherein the cell 12 is covered in the communication service by the base station 14.

In the serving area of the cell 12 shown in FIG. 1, a mobile station 16 is also illustrated. The mobile station 16 usually includes an antenna 18 for transmitting and receiving wireless communication signals; a lower layer 20 for processing data related to communications between the mobile station 16 and the base station 14 through the antenna 18; and an upper layer 22 usually including elements such as a processor and a memory, for communicating with the base station 14 through the lower layer 20 and the antenna 18 to construct a communication network. Since the mobile station 16 herein locates at the serving range of the cell 12, the mobile station 16 will select the cell 12 as a serving cell.

According to various kinds of wireless communication specifications in the $3^{rd}$ Generation Partnership Project (3GPP), standards describing which elements in a wireless communication system should respectively reach a working time thereof are defined in detail. Many of the standards are involved with calculations of maximum time limitations. For example, the 3GPP TS 05.08 specification defined in the 3GPP for radio subsystem link control of the cellular wireless communication system defines that within a period of thirty seconds, a mobile station should check the Base Station Identification Code (BSIC) for each carrier out of Broadcast Control Channel (BCCH) carriers of non-serving cells (also referred to as neighbor cells) relating to the recent six strongest receiving power levels. This ensures that the mobile station is still monitoring the same cell. The specification also defines that within a period of five minutes, a mobile station should decode a BCCH data block of each carrier out of the BCCH carriers of non-serving cells relating to the recent six strongest receiving power levels. The BCCH data block includes parameters that will influence a cell reselection operation of each carrier out of the BCCH carriers of non-serving cells relating to the recent six strongest receiving power levels. In order to reach the timing in the wireless communication system 10 mentioned above, it is common to use system resources of the mobile station 16 to generate at least one timer. For example, the system resources used to generate the timer could be the operation bandwidth of a processor and the storage volume of a memory, both located in the upper layer 22. As shown in FIG. 1, in order to perform checking of the BSIC for each carrier out of six BCCH carriers, the mobile station 16 must generate six first timers 17a-17f corresponding to the six BCCH carriers, respectively. Please note, the timing period of each first timer is assumed to be thirty seconds herein. Similarly, in order to perform decoding of the BCCH data block to derive the parameters for the cell reselection operation, the mobile station 16 must generate six second timers 19a-19f corresponding to the six BCCH carriers, respectively. The timing period of each second timer is assumed to be five minutes herein.

Furthermore, as processing power of the mobile station 16 of the prior art is limited, the lower layer 20 thereof is only capable of checking the BSIC corresponding to one neighbor cell at a time. For the same reason, the lower layer 20 is only capable of decoding the BCCH data block corresponding to one neighbor cell at a time.

Thus, using the method mentioned above, the mobile station 16 in the wireless communication system 10 must generate a dedicated timer corresponding to each carrier to achieve the functionality of timing calculations for each of the above-mentioned actions (e.g. the action of checking the BSIC or the action of decoding the BCCH data block) that needs timing operation in the mobile station 16. As a result, a lot of system resources of the mobile station 16 are occupied and therefore the working efficiency is influenced.

Additionally, as the period of the action of checking the BSIC and the period of the action of decoding the BCCH data block are controlled using the first timers 17a-17f and the second timers 19a-19f, respectively, the action of checking the BSIC and the action of decoding the BCCH data block are not synchronized. Therefore, if any frequency error occurs between the serving cell and one of the neighbor cells, it is possible to introduce timing drift, resulting in failure of decoding the BCCH data block.

SUMMARY

It is therefore an objective of the present invention to provide a timing method applicable to a mobile station and related devices in a wireless communication system to solve the above-mentioned problem.

The present invention provides a timing method applicable to a mobile station in a wireless communication system. The timing method includes: generating at least a first buffering area in the mobile station; receiving a first action executed by a lower layer of the mobile station; after the mobile station receives the first action, updating a value stored in the first buffering area; and if the value stored in the first buffering area reaches a first predetermined value, performing a second action.

The present invention further provides a mobile station in a wireless communication system. The mobile station includes: a lower layer for performing a first action; at least a first buffering area for storing a value; and an upper layer for receiving the first action executed by the lower layer and updating the value stored in the first buffering area after receiving the first action; wherein if the value stored in the first buffering area reaches a first predetermined value, the mobile station performs a second action.

The timing method of the present invention utilizes the first action executed by the lower layer of the mobile station to derive a timing unit. Whenever receiving the first action, the mobile station updates (e.g. increases) the value stored in the buffering area generated by the mobile station Additionally, the mobile station uses the value stored in the buffering area as a time basis for performing the second action.

These and other objectives of the present invention will no doubt become obvious to those of ordinary skill in the art after reading the following detailed description of the preferred embodiment that is illustrated in the various figures and drawings.

DETAILED DESCRIPTION

Figure 1:
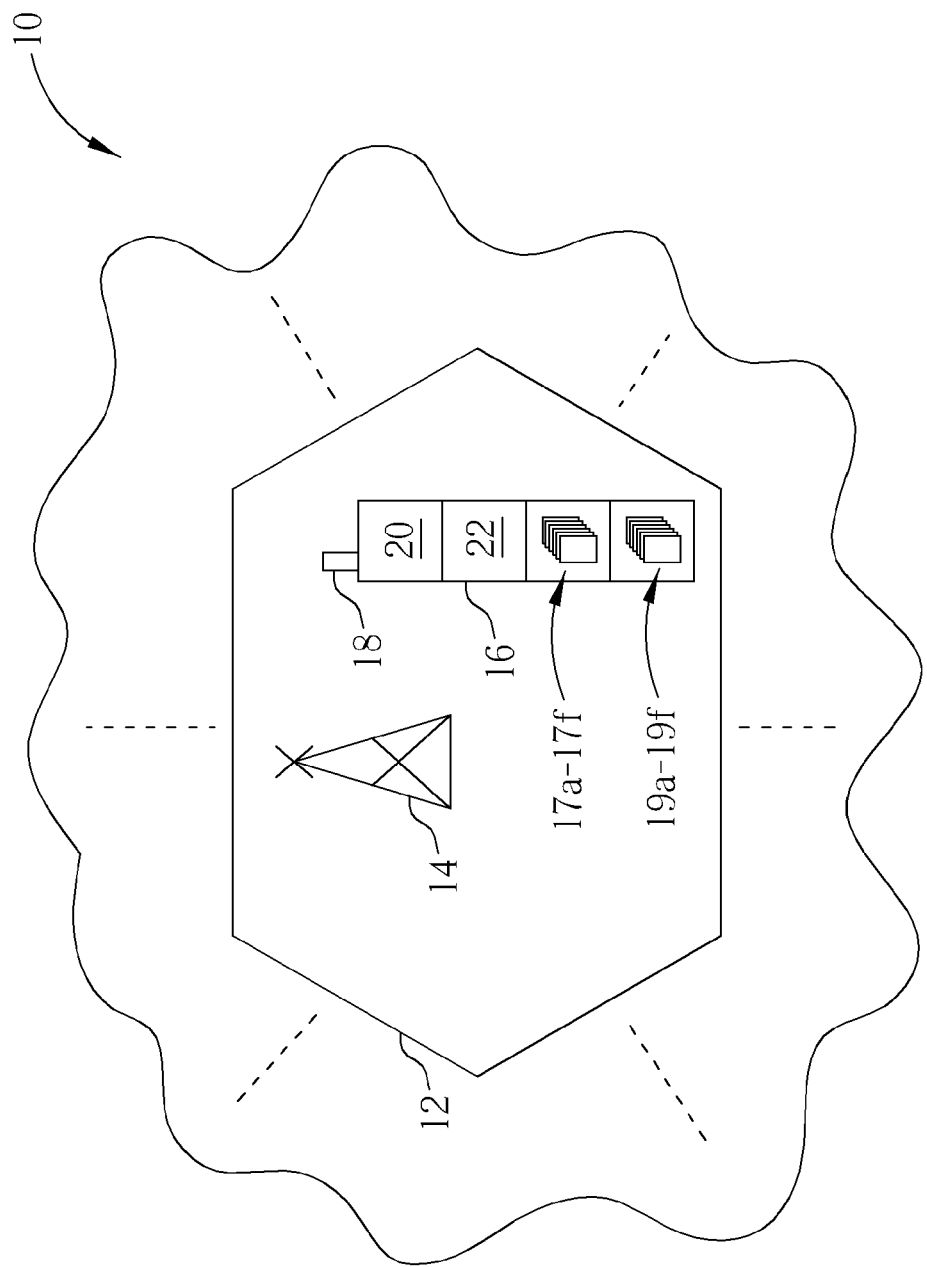
FIG. 1 is a diagram of a wireless communication system according to the related art.
Figure 2:
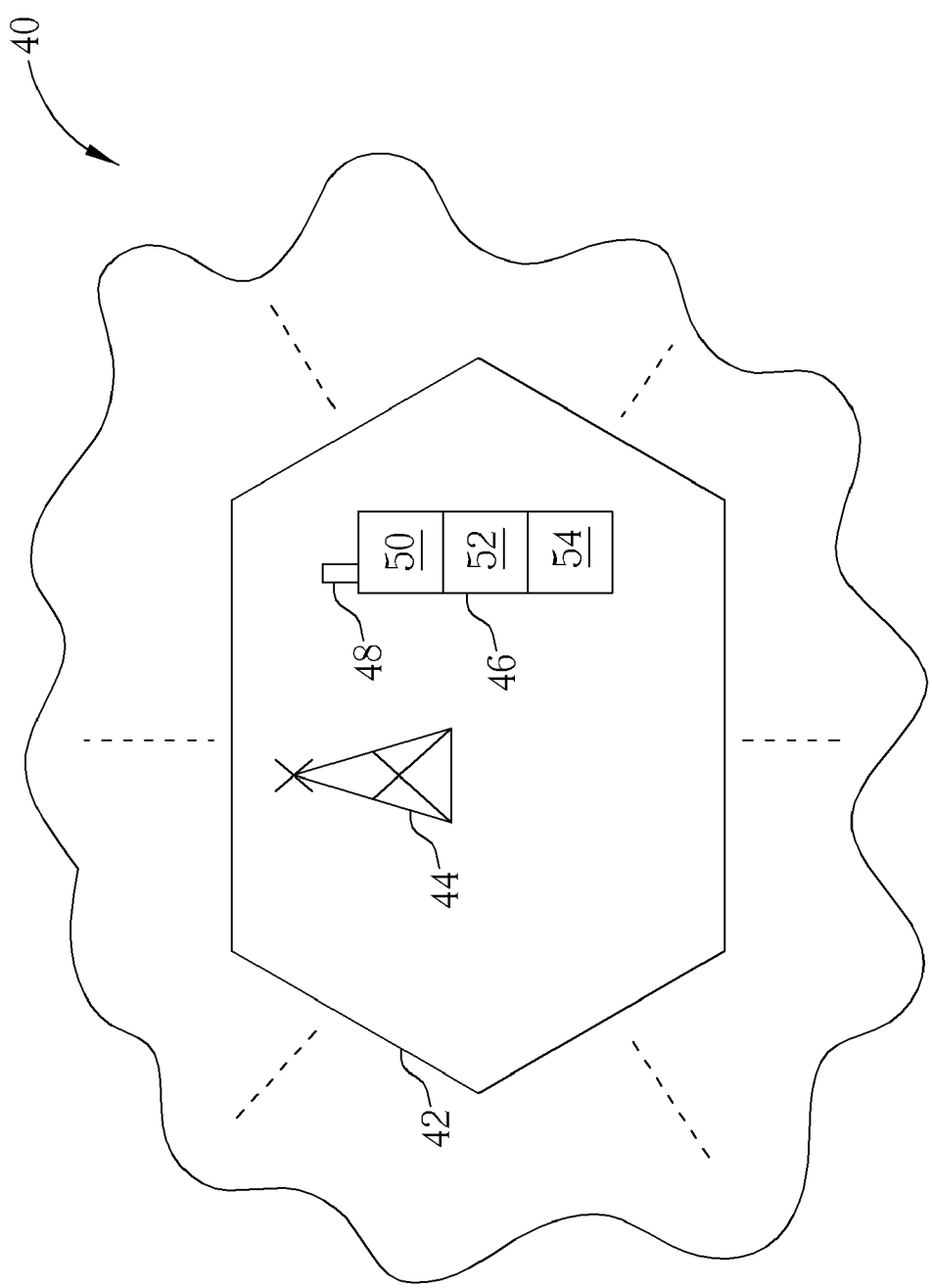
FIG. 2 is a diagram of a wireless communication system according to the present invention.

Please refer to FIG. 2 showing a diagram of a wireless communication system 40 according to the present invention. Similar to FIG. 1, FIG. 2 illustrates only one cell 42 as an example, wherein the cell 42 is covered in communication services of a base station 44.

In the service area of the cell 42 shown in FIG. 2, a mobile station 46 is also illustrated. Similar to the mobile station 16 of the prior art, the mobile station 46 includes an antenna 48 for transmitting and receiving wireless communication signals; a lower layer 50 for processing data related to communications between the mobile station 46 and the base station 44 through the antenna 48; and an upper layer 52 including elements such as a processor and a memory, for communicating with the base station 44 through the lower layer 50 and the antenna 48 to construct a communication network. Different from the mobile station 16 of the prior art, the mobile station 46 does not include the first and second timers mentioned above. Instead, the mobile station 46 includes a buffering area 54. In addition, because the mobile station 46 is located within the serving range of the cell 42, the mobile station 46 selects the cell 42 as a serving cell.

Figure 3:
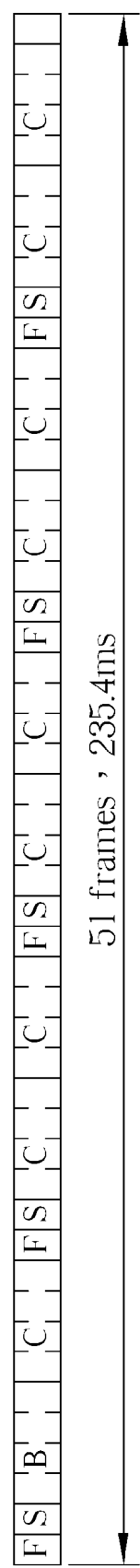
FIG. 3 is a diagram of a multiframe having fifty-one frames.

Please refer to FIG. 3 showing a diagram of a multiframe having fifty-one frames. The multiframe shown in FIG. 3 is described in detail in the 3GPP TS 05.08 specification defined in the 3GPP for the physical layer on the radio path of the cellular wireless communication system. In this specification, it is defined that in an idle mode, the multiframe of a downlink includes: frames F of the Frequency Correction Burst, frames S of the Synchronization Burst, a frame B of the Broadcast Control Channel (BCCH), and frames C of the Common Control Channel (CCCH) for transmitting frame information related to the Frequency Correction Burst, the Synchronization Burst, the BCCH, and the CCCH, respectively. Wherein, it is also defined that the width of each frame is 4.615 ms. As a result, the width of the multiframe shown in FIG. 3 can be derived from the following equation:

$$4.615ms \times 51 \approx 235.4ms$$

As the width of the multiframe mentioned above is known, the width of the multiframe can be used as a timing unit according to the present invention. In addition to the multiframe, this specification also defines many other message transmission basic units having known widths, respectively. Therefore, these message transmission basic units can be used as timing units according to the present invention.

According to a definition in this specification, within a period of five seconds, the lower layer 50 should send a measurement report relating to six non-serving cells having the most recent six strongest receiving power levels, respectively, to the mobile station 46. More specifically, the measurement report is sent to the upper layer 52 thereof. The measurement report is included in the information of the CCCH. Therefore, if the lower layer 50 sends a measurement report to the upper layer 52 of the mobile station 46 every twenty multiframes as shown in FIG. 3 (i.e. the period equals to the width of twenty multiframes), the mobile station 46 will receive a measurement report every 4.71 seconds, wherein the period of 4.71 seconds is derived from the following equation:

$$235.4ms \times 20 \approx 4.71s$$

Figure 4:
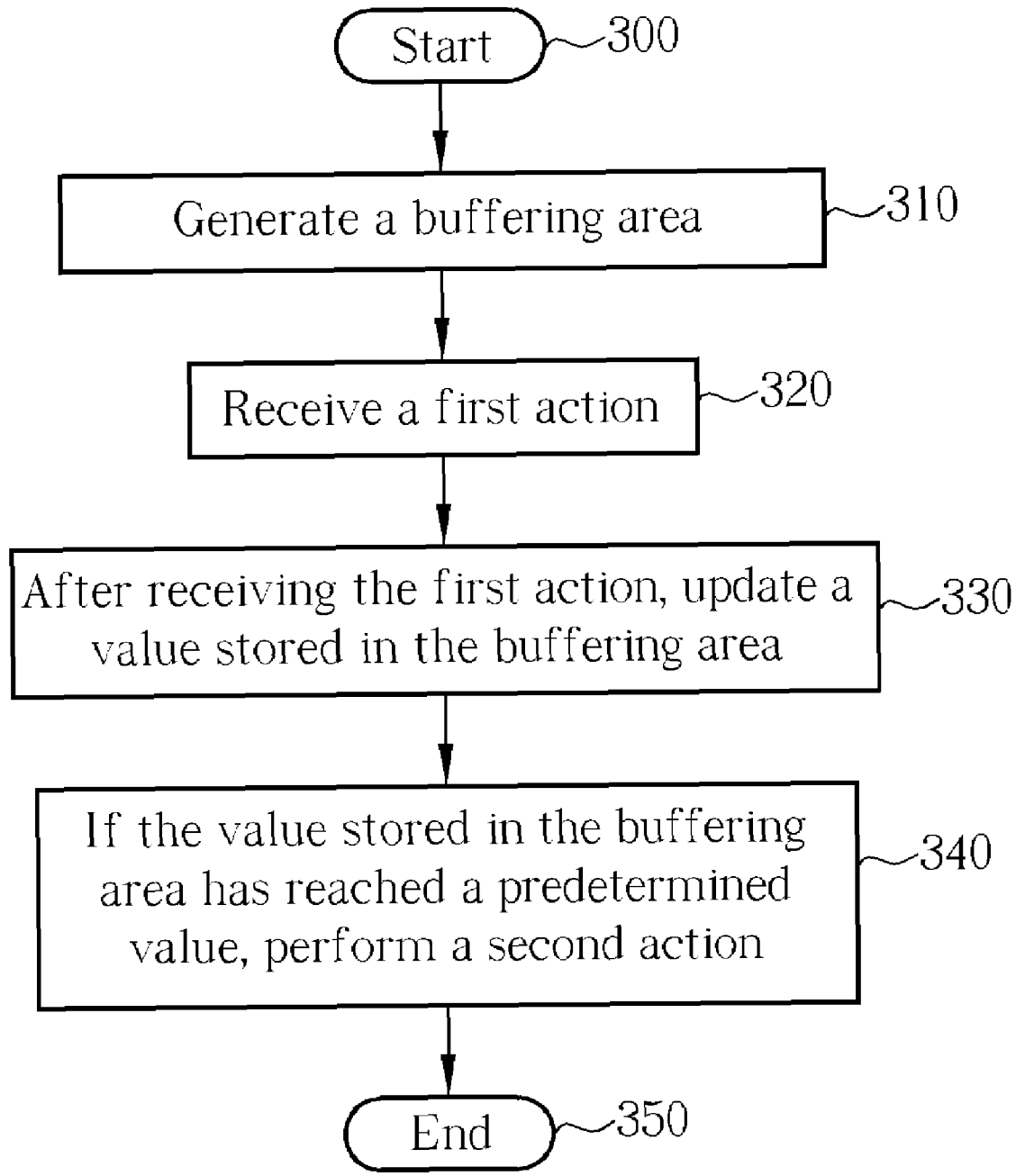
FIG. 4 is a flowchart of a timing method according to the present invention.

That is, in the present invention, the period of the event of receiving a measurement report from the lower layer 50 by the mobile station 46 can also be used as a timing unit of the present invention. Please refer to FIG. 4 showing a flowchart of a timing method according to the present invention. The timing method shown in FIG. 4 can be applied in the wireless communication system 40 and the mobile station 46 thereof shown in FIG. 2. The timing method includes the following steps:

Step 300: Start.

Step 310: Generate a buffering area 54 in the mobile station 46. The mobile station 46 herein can utilize the system resources (e.g. the processor and the memory mentioned above) of the upper layer 52 thereof to generate the buffering area 54. Those skilled in the art will understand that generating a buffering area requires significantly less system resources in contrast to generating a timer.

Step 320: The upper layer 52 of the mobile station 46 then receives a first action executed by the lower layer 50 of the mobile station 46. Since the first action herein is a periodic event, the period of the first action can be used as a timing unit of the mobile station 46.

Step 330: After the upper layer 52 of the mobile station 46 receives the first action, update a value stored in the buffering area 54. Normally the buffering area 54 has an initial value (e.g. the initial value can be zero). In order to used the period of the first action as the timing unit mentioned above, the mobile station 46 is capable of increasing the value stored in the buffering area 54 (e.g. with an increment of one) whenever the upper layer 52 receives the first action. Thus, the value stored in the buffering area 54 will be the number of times that the first action occurs.

Step 340: If the value stored in the buffering area 54 reaches a predetermined value, the mobile station 46 will perform a second action. That is, when the number of times that the first action has occurred reaches the predetermined value, the mobile station 46 performs the second action.

Step 350: End.

As mentioned above, using the timing method of the present invention shown in FIG. 4, the initial value and the predetermined value stored in the buffering area 54 can be set according to the period of the first action and a period of the second action. As a result of the steps mentioned above, the goal of timing control is achieved.

Figure 5:
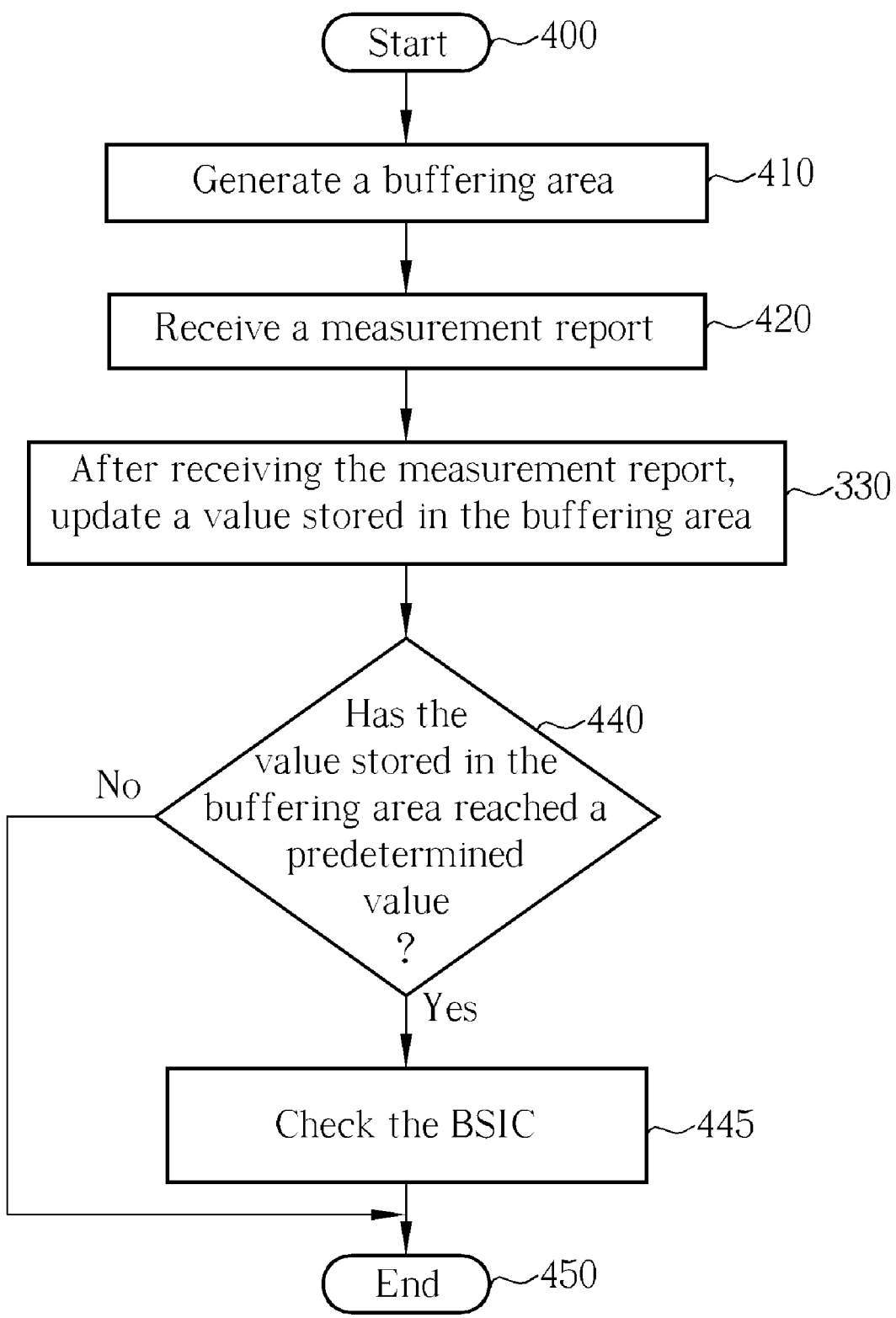
FIG. 5 is a flowchart of the timing method shown in FIG. 4 according to a first embodiment of the present invention.

Please refer to FIG. 5 showing a flowchart of the timing method shown in FIG. 4 according to a first embodiment of the present invention. In FIG. 5, the mobile station 46 is in an idle mode. The first action includes sending the measurement report from the lower layer 50 of the mobile station 46 to the upper layer 52 the mobile station 46. In addition, the second action includes checking a Base Station Identification Code (BSIC) of each neighbor cell out of six non-serving cells having the recent six strongest receiving power levels. As the period of the first action is 4.71 seconds, the initial value of the buffering area 54 can be set to be zero, and the predetermined value can be set to be six. That is, the second action is performed after the first action has been repeated six times, i.e. after the time derived from the following equation:

$$4.71s \times 6 = 28.26s$$

According to this equation, the period of the second action is equal to 28.26 seconds, which complies with the definition where the second action should be performed within a period of thirty seconds. The timing method according to the first embodiment includes the following steps:

Step 400: Start.

Step 410: Generate a buffering area 54 in the mobile station 46. The mobile station 46 herein can utilize the system resources (e.g. the processor and the memory mentioned above) of the upper layer 52 thereof to generate the buffering area 54. The initial value of the buffering area 54 is set to be zero.

Step 420: Receive with the upper layer 52 of the mobile station 46 a measurement report sent from the lower layer 50 of the mobile station 46. In this embodiment, the lower layer 50 of the mobile station 46 utilizes the above-mentioned multiframe having fifty-one frames shown in FIG. 2 to transmit the measurement report whose period is equal to 4.71 seconds.

Step 430: After the upper layer 52 of the mobile station 46 receives the measurement report, update a value stored in the buffering area 54. In this embodiment, after receiving the measurement report, the mobile station 46 increases the value stored in the buffering area 54 with an increment of one.

Step 440: Check if the value stored in the buffering area 54 reaches a predetermined value. In this embodiment, the predetermined value is equal to six. If the value stored in the buffering area 54 has reached six, enter step 445; otherwise, enter step 450.

Step 445: Check the BSIC of the neighbor cell out of the six non-serving cells having the recent six strongest receiving power levels.

Step 450: End.

As mentioned above, using the timing method according to the first embodiment of the present invention shown in FIG. 5, the initial value and the predetermined value in the buffering area 54 can be set according to the period of receiving the measurement report by the mobile station 46 and the period of checking the BSIC of each neighbor cell out of the six non-serving cells having the recent six strongest receiving power levels. As a result of the steps mentioned above, the goal of timing control is achieved.

In the first embodiment mentioned above, the processing power of the lower layer 50 of the mobile station 46 is sufficient to handle the task of checking all the BSIC of the six non-serving cells. Therefore, the mobile station 46 only needs to generate one buffering area 54. Of course, according to another embodiment of the present invention, the mobile station 46 can be designed to have a plurality of buffering areas. In this situation, the number of buffering areas is determined according to the processing power of the mobile station 46. For example, when the mobile station 46 is only capable of checking the BSIC of one neighbor cell out of the six non-serving cells at a time, the mobile station 46 must have six buffering areas corresponding to all six non-serving cells having the recent six strongest receiving power levels, respectively. As mentioned above, generating a buffering area requires significantly less system resources in contrast to generating a timer. Therefore, even if the mobile station 46 has to generate six buffering areas, the system resources required are still less than those needed in the prior art.

Figure 6:
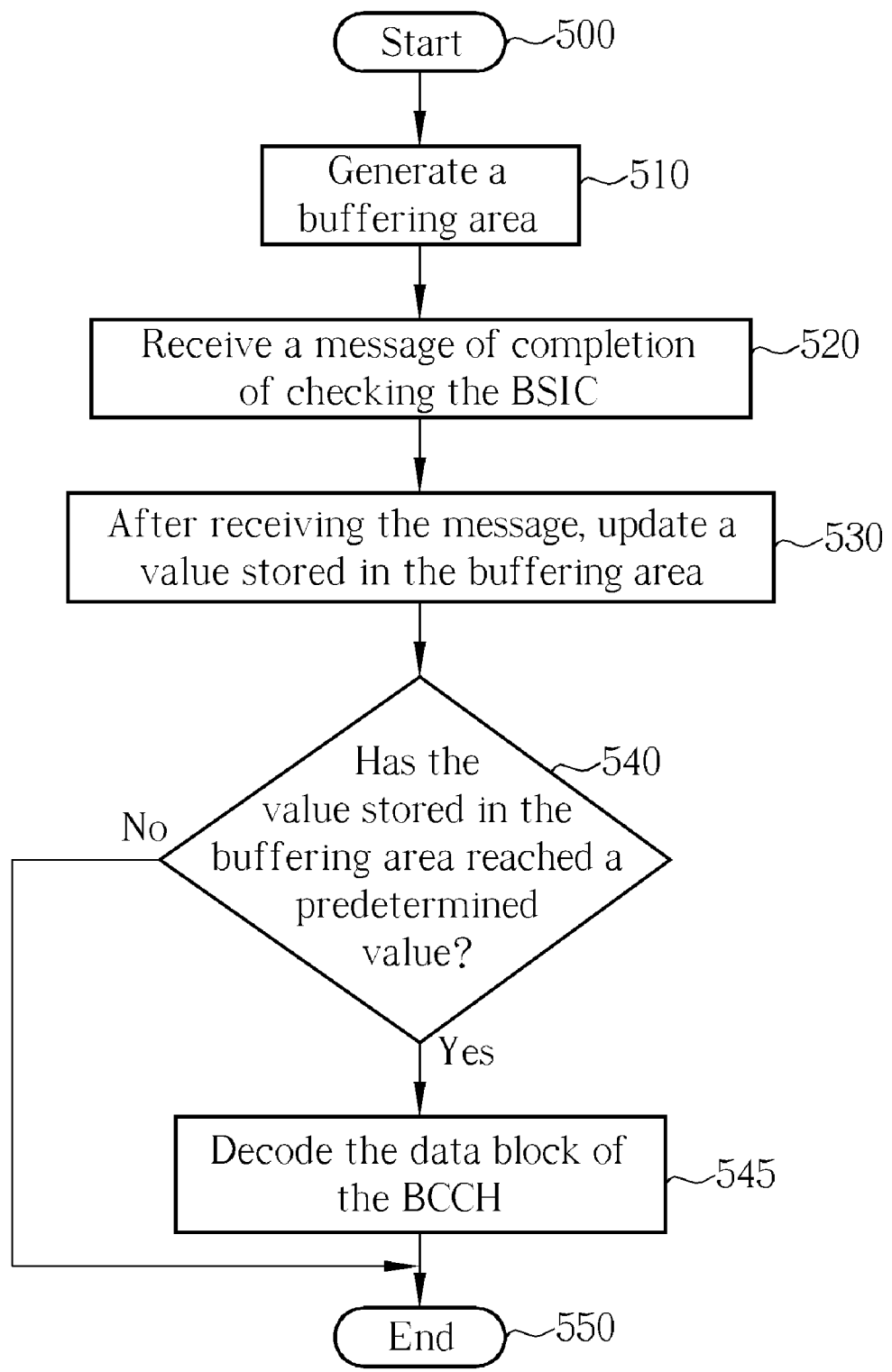
FIG. 6 is a flowchart of the timing method shown in FIG. 4 according to a second embodiment of the present invention.

Please refer to FIG. 6 showing a flowchart of the timing method shown in FIG. 4 according to a second embodiment of the present invention. In FIG. 6, the mobile station 46 is in an idle mode, and the lower layer 50 of the mobile station 46 is capable of sending a message of completion of checking the BSIC of each neighbor cell out of the six non-serving cells having the recent six strongest receiving power levels to the upper layer 52 of the mobile station 46. In this embodiment, the first action includes sending the message of completion of checking the BSIC of each neighbor cell out of the six non-serving cells having the recent six strongest receiving power levels from the lower layer 50 of the mobile station 46 to the upper layer 52 of the mobile station 46. In addition, the second action includes decoding a data block of the BCCH of the neighbor cell to derive parameters related to cell reselection operations. With the same assumption of the first embodiment, it can be derived that the period of the first action in the second embodiment is 28.26 seconds. Therefore, the initial value of the buffering area 54 can be set to be zero, and the predetermined value can be set to be ten. That is, in the second embodiment, the second action is performed after the first action has been repeated ten times, i.e., after the time derived from the following equation:

$$28.26s \times 10 = 4.71min$$

According to this equation, the period of the second action is equal to 4.71 minutes, which complies with the definition where the second action should be performed within a period of five minutes. The timing method according to the second embodiment includes the following steps:

Step 500: Start.

Step 510: Generate a buffering area 54 in the mobile station 46. The mobile station 46 herein can utilize the system resources (e.g. the processor and the memory mentioned above) of the upper layer 52 thereof to generate the buffering area 54. The initial value of the buffering area 54 is set to be zero.

Step 520: The upper layer 52 of the mobile station 46 receives the message of completion of checking the BSIC of the neighbor cell out of the six non-serving cells. In this embodiment, the message of completion of checking the BSIC of the neighbor cell is sent from the lower layer 50 of the mobile station 46 with a period of 28.26 seconds.

Step 530: After the upper layer 52 of the mobile station 46 receives the message, update a value stored in the buffering area 54. In this embodiment, after receiving the message, the mobile station 46 increases the value stored in the buffering area 54 with an increment of one.

Step 540: Check if the value stored in the buffering area 54 reaches a predetermined value. In this embodiment, the predetermined value is equal to ten. If the value stored in the buffering area 54 has reached ten, enter step 545; otherwise, enter step 550.

Step 545: Decode the data block of the BCCH of the neighbor cell to derive the parameters related to the cell reselection operations.

Step 550: End.

As mentioned above, using the timing method according to the second embodiment of the present invention shown in FIG. 6, the initial value of the buffering area 54 and the predetermined value can be designed according to the period of receiving the message by the mobile station 46 and the period of decoding the data block of the BCCH of the neighbor cell. As a result of the steps mentioned above, the goal of timing control is achieved.

Similarly, in the second embodiment mentioned above, the processing ability of the lower layer 50 of the mobile station 46 is sufficient to handle the task of decoding the data blocks of the BCCHs of all the six non-serving cells at a time. Therefore, the mobile station 46 only needs to generate a buffering area 54. Of course, according to another embodiment of the present invention, the mobile station 46 can be designed to have a plurality of buffering areas, wherein the number of the buffering areas is determined according to the processing ability of the mobile station 46. For example, when the mobile station 46 is only capable of decoding the data block of the BCCH of one neighbor cell out of the six non-serving cells at a time, the mobile station 46 must have six buffering areas corresponding to all the six non-serving cells having the recent six strongest receiving power levels, respectively. As mentioned above, generating a buffering area requires significantly less system resources in contrast to generating a timer. Therefore, even if the mobile station 46 has to generate six buffering areas, the system resources required are still less than those needed in the prior art.

In addition, in contrast to the prior art, the decoding action of the BCCH data block uses the period of the checking action of the BSIC as the timing unit, so the checking action of the BSIC and the decoding action of the BCCH data block can be synchronized. That is, after completing the checking action of the BSIC, the mobile station 46 will perform the decoding action of the BCCH data block right away. Additionally, when performing the decoding action of the BCCH data block, the mobile station 46 derives the latest synchronization information. As a result, even if any frequency error occurs between the serving cell and one of the neighbor cells, the occurrence of timing drift and failure in decoding the BCCH data block can be prevented.

Furthermore, while retaining the teachings of the present invention, those skilled in the art will easily understand that the initial value and the predetermined value in the buffering area 54 can be set according to the period of receiving the measurement report by the mobile station 46 and a period of decoding the data block of the BCCH of the neighbor cell, so as to use the steps shown in FIG. 4 to achieve the goal of timing control.

Furthermore, while retaining the teachings of the present invention, those skilled in the art may easily combine the first embodiment and the second embodiment, so as to use the period of a first action as the timing unit of a second action and use the period of the second action as the timing unit of a third action, i.e. use the period of sending the measurement report (the first action) as the timing unit of checking the BSIC of a neighbor cell (the second action) and use the period of checking the BSIC of a neighbor cell (the second action) as the timing unit of decoding the data block of the BCCH of the neighbor cell (the third action). Thus, the mobile station 46 have to generate a first buffering area together with a second buffering area, wherein the first buffering area is used for recording the number of times that the first action occurs, and the second buffering area is used for recording the number of times that the second action occurs. When the number of times that the first action occurs reaches a first predetermined value, e.g. six, the mobile station 46 performs the second action. Additionally, when the number of times that the second action occurs reaches a second predetermined value, e.g. ten, the mobile station 46 performs the third action.

More specifically, when the number of times that the mobile station 46 receives the measurement report reaches six, the mobile station 46 will perform the checking action of the BSIC. Additionally, when the number of times that the mobile station 46 performs the checking action of the BSIC reaches ten, the mobile station 46 will perform the decoding action of the BCCH data block. Furthermore, in this embodiment, the processing power of the lower layer 50 of the mobile station 46 is sufficient to handle both the task of checking the BSIC of all the six non-serving cells at a time and the task of decoding the data blocks of the BCCHs of all the six non-serving cells at a time. Therefore, the mobile station 46 only needs to generate a first buffering area and a second buffering area.

Of course, according to another embodiment of the present invention, when the processing power of the lower layer 50 of the mobile station 46 is insufficient to perform all the tasks at a time, e.g. the mobile station 46 is only capable of checking the BSIC of one neighbor cell at a time and is only capable of decoding the data block of the BCCH of one neighbor cell at a time, the mobile station 46 must generate six first buffering areas and six second buffering areas. That is, according to the present invention, the numbers of the first and second buffering areas can be determined according to the processing power of the mobile station 46.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A timing method for a mobile station in a wireless communication system, the mobile station comprising a lower layer and an upper layer, the timing method comprising:

generating at least a first buffering area in the mobile station for storing a value representing a number of occurrences of a periodic event;

receiving a first action with the upper layer from the lower layer, the first action occurring at a first periodic interval;

updating the value stored in the first buffering area with the upper layer after receiving the first action; utilizing the first periodic interval of the first action executed by the lower layer of the mobile station to derive a timing unit;

comparing the value stored in the first buffering area with a first predetermined value; and when the value stored in the first buffering area reaches the first predetermined value, utilizing the compared or the predetermined value and a timing unit as a time basis for performing a second action with the lower layer to monitor a neighboring cell in the wireless communication system;

wherein the second action occurs at a second periodic interval greater than the first periodic interval.

2. The timing method of claim 1, wherein the mobile station is in an idle mode.

3. The timing method of claim 1, wherein the first action comprises sending a measurement report from the lower layer of the mobile station to the mobile station.

4. The timing method of claim 3, wherein the second action comprises checking a Base Station Identification Code (BSIC) of a neighbor cell.

5. The timing method of claim 3, wherein the second action comprises decoding a data block of a Broadcast Control Channel (BCCH) of a neighbor cell to derive parameters related to cell reselection operations.

6. The timing method of claim 1, wherein the first action comprises sending a message of completion of checking a Base Station Identification Code (BSIC) of a neighbor cell from the lower layer of the mobile station.

7. The timing method of claim 6, wherein the second action comprises decoding a data block of a Broadcast Control Channel (BCCH)of a neighbor cell to derive parameters related to cell reselection operations.

8. The timing method of claim 1, wherein the updating step further comprises:
after receiving the first action, increasing the value stored in the first buffering area.

9. The timing method of claim 1, wherein the generating step further comprises generating a second buffering area in the mobile station, and the timing method further comprises:
receiving a message corresponding to the second action, sent from the lower layer;
updating a value stored in the second buffering area;
comparing the value stored in the second buffering area with a second predetermined value; and
when the value stored in the second buffering area reaches the second predetermined value, performing a third action with the mobile station.

10. The timing method of claim 9, wherein the first action comprises sending a measurement report from the lower layer of the mobile station to the mobile station, the second action comprises checking a Base Station Identification Code (BSIC) of a neighbor cell, and the third action comprises decoding a data block of a Broadcast Control Channel (BCCH) of a neighbor cell to derive parameters related to cell reselection operations.

11. A mobile station in a wireless communication system, the mobile station comprising:
a lower layer performing a first action occurring at a first periodic interval;
at least a first buffering area storing a value representing a number of occurrences of a periodic event; and
an upper layer receiving the first action executed by the lower layer, updating the value stored in the first buffering area after receiving the first action, deriving a timing unit based on the first periodic interval of the first action executed by the lower layer of the mobile station, and comparing the value stored in the first buffering area with the with a first predetermined value;
the lower layer performing a second action based on the compared or the predetermined value and a timing unit as a time basis to monitor a neighboring cell in the wireless communication system when the value stored in the first buffering area reaches the first predetermined value, and the second action occurs at a second periodic interval greater than the first periodic interval.

12. The mobile station of claim 11, wherein the mobile station is in an idle mode.

13. The mobile station of claim 11, wherein the first action comprises sending a measurement report from the lower layer of the mobile station to the mobile station.

14. The mobile station of claim 13, wherein the second action comprises checking a Base Station Identification Code (BSIC) of a neighbor cell.

15. The mobile station of claim 13, wherein the second action comprises decoding a data block of a Broadcast Control Channel (BCCH) of a neighbor cell to derive parameters related to cell reselection operations.

16. The mobile station of claim 11, wherein the first action comprises sending a message of completion of checking a Base Station Identification Code (BSIC) of a neighbor cell from the lower layer of the mobile station.

17. The mobile station of claim 16, wherein the second action comprises decoding a data block of a Broadcast Control Channel (BCCH) of a neighbor cell to derive parameters related to cell reselection operations.

18. The mobile station of claim 11, wherein after receiving the first action, the upper layer increases the value stored in the first buffering area.

19. The mobile station of claim 11 further comprising:
a second buffering area for storing a value;
wherein the upper layer updates the value stored in the second buffering area after receiving a message corresponding to the second action, sent from the lower layer, and the mobile station compares the value stored in the second buffering area with a second predetermined value and performs a third action if the value stored in the second buffering area reaches the second predetermined value.

20. The mobile station of claim 19, wherein the first action comprises sending a measurement report from the lower layer of the mobile station to the mobile station, the second action comprises checking a Base Station Identification Code (BSIC) of a neighbor cell, and the third action comprises decoding a data block of a Broadcast Control Channel (BCCH) of a neighbor cell to derive parameters related to cell reselection operations.

21. The mobile station of claim 11, wherein the mobile station utilizes the system resource of the upper layer to generate the first buffering area.

22. The mobile station of claim 21, wherein the mobile station utilizes a processor or a memory in the upper layer to generate the first buffering area.

23. A wireless communication system for implementing the mobile station of claim 11.

* * * * *